US010787766B2

United States Patent
Sutterlin et al.

(10) Patent No.: US 10,787,766 B2
(45) Date of Patent: Sep. 29, 2020

(54) METHODS FOR THE PRODUCTION OF PULP AND HEMICELLULOSE

(71) Applicant: Inventure Renewables, Inc., Tuscaloosa, AL (US)

(72) Inventors: William Rusty Sutterlin, Tuscaloosa, AL (US); Cory O'Neil Blanchard, Tuscaloosa, AL (US); Christopher Check, Tuscaloosa, AL (US)

(73) Assignee: Inventure Renewables, Inc., Tuscaloosa, AL (US)

( * ) Notice: Subject to any disclaimer, the term of this patent is extended or adjusted under 35 U.S.C. 154(b) by 33 days.

(21) Appl. No.: 16/375,412

(22) Filed: Apr. 4, 2019

(65) Prior Publication Data

US 2019/0309473 A1    Oct. 10, 2019

Related U.S. Application Data

(60) Provisional application No. 62/652,808, filed on Apr. 4, 2018.

(51) Int. Cl.
| | | |
|---|---|---|
| *D21C 11/00* | (2006.01) | |
| *C08H 8/00* | (2010.01) | |
| *C08B 1/00* | (2006.01) | |
| *D21C 3/00* | (2006.01) | |
| *D21H 11/00* | (2006.01) | |
| *D21C 3/22* | (2006.01) | |
| *D21C 1/02* | (2006.01) | |

(52) U.S. Cl.
CPC .......... *D21C 11/0007* (2013.01); *C08B 1/003* (2013.01); *C08H 8/00* (2013.01); *D21C 1/02* (2013.01); *D21C 3/003* (2013.01); *D21C 3/22* (2013.01); *D21H 11/00* (2013.01)

(58) Field of Classification Search
None
See application file for complete search history.

(56) References Cited

U.S. PATENT DOCUMENTS 8,282,738 B2 * 10/2012 Kilambi .................. C07H 1/00
127/1
8,968,479 B2 * 3/2015 Kilambi .................. C12P 7/10
127/44

OTHER PUBLICATIONS

Toscan et al., "High-pressure carbon dioxide/water pre-treatment of sugarcane bagasse and elephant grass: Assessment of the effect of biomass composition on process efficiency" Bioresource Technology, 2017, v 224, p. 639-647.
Jing et al., "Effectively enhancing conversion of cellulose to HMF by combining in-situ carbonic acid from CO2 and metal oxides" Industrial Crops & Products, 2018, v 126, p. 151-157.
Morais et al., "Direct Hydrolysis of Biomass Polymers using High-pressure CO2 and CO2—H2O Mixtures" Green Chemistry Series No. 48, 2017, p. 83-114.
Van Walsun et al., "Carbonic acid enhancement of hydrolysis in aqueous pretreatment of corn stover" Bioresource Technology, 2004, 93, p. 217-226.
Morais et al., "Carbon Dioxide in Biomass Processing: Contributions to the Green Biorefinery Concept" Chemical Reviews, 2015, v 115, p. 3-27.
Yang et al., "Behaviors of rice straw two-step liquefaction with sub/supercritical ethanol in carbon dioxide atmosphere" Bioresource Technology, 2018, v 258, p. 287-294.
Relvas et al., "Selective hydrolysis of wheat straw hemicellulose using high-pressure CO2 as catalyst" RSC Advances, 2015, v 5, 9 73935-73944.
Swamy, "Supercritical Carbon Dioxide Pretreatment of Various Lignocellulosic Biomasses" Thesis Presentation, Jun. 2010.
Relvas et al., "Kinetic modeling of hemicellulose-derived biomass hydrolysis underhigh pressure CO2—H2O mixture technology" The Journal of Supercritical Fluids, 2015, v 99, p. 95-102.

* cited by examiner

*Primary Examiner* — Dennis R Cordray
(74) *Attorney, Agent, or Firm* — Greer, Burns & Crain, Ltd.; Gregory P. Einhorn

(57) ABSTRACT

In alternative embodiments, provided are methods and industrial processes for generating pulp from lignocellulosic feedstocks, comprising directly contacting a lignocellulosic feedstock with a system comprising a super critical or sub-super critical fluid or mixture of fluids, whereby the partial pressure of the system provides for the hydrolysis or a combination thereof of the feedstock at reduced temperatures and pressures, followed by an upgrading step wherein a low-purity cellulosic material generated in the super critical or sub-super critical reaction step is treated with an alkaline solution. In alternative embodiments, provided are systems and methods for producing a cellulose material using reduced amounts of water.

19 Claims, No Drawings

US 10,787,766 B2

METHODS FOR THE PRODUCTION OF PULP AND HEMICELLULOSE

RELATED APPLICATIONS

This U.S. Utility Patent Application claims the benefit of priority under 35 U.S.C. § 119(e) of U.S. Provisional Application Ser. No. (USSN) 62/652,808 filed Apr. 4, 2018. The aforementioned application is expressly incorporated herein by reference in its entirety and for all purposes.

FIELD OF THE INVENTION

This invention generally relates to the fractionation of feedstocks comprising lignocellulose to provide cellulose, hemicellulose, and lignin. More particularly, in alternative embodiments, provided are methods and industrial processes for generating a pulp stream, hemicellulose and/or hemicellulose monomers stream, and a lignin stream from lignocellulosic feedstocks, e.g., feedstocks comprising a biomass, comprising directly contacting a lignocellulosic feedstock with a system comprising a super critical or sub-critical fluid or mixture of fluids, followed by an upgrading step wherein a low-purity cellulosic material generated is treated with an alkaline solution to generate the lignin soluble alkaline solution. In alternative embodiments, provided are systems and methods for producing hemicellulose, lignin, and cellulose material using reduced amounts of water.

BACKGROUND

Pulp from cellulosic wood and other plant fibers is used in a large number of commercial applications. The most common use of pulp is in the manufacturing of paper products, although a number of higher-value products can also be produced from pulp including rayon and other synthetics, as well as cellulose acetate and cellulose esters used in the manufacturing of explosives, packaging films and other products.

The "pulping" process refers to the separation of cellulose fibers from their lignocellulosic structures. Lignocellulosic material comprises a network of complex polymers including cellulose, hemicellulose, lignin, and other minor components. In order to generate a useable fiber product, the lignin and hemicellulose molecules must be fragmented in order to liberate the individual cellulosic fibers from the network.

The most widely used pulping process is the kraft process. In a conventional kraft mill, a cellulose-containing material, typically sized-reduced wood, is treated with an aqueous mixture of sodium hydroxide and sodium sulfide, referred to as "white liquor". The white liquor treatment serves to break down linkages between the lignin and the cellulose fibers and also serves to degrade and solubilize a substantial portion of the hemicellulose present in the wood. The soluble hemicellulose fraction is separated from the cellulose product, which is then subjected to any number of downstream upgrading and finishing steps, depending on the desired end product.

The kraft process, as described above, typically produces fairly low-grade pulps with alpha cellulose contents in the range of between about 75- to 88-alpha. The resulting kraft pulp can either be used directly in the production of paper, cardboard, or various other end products, or subjected to an upgrading process in order to increase the alpha cellulose content of the pulp by further separating a portion of the remaining hemicellulose impurities. The upgrading step typically comprises contacting the kraft pulp with a strong caustic solution in order to cleave a portion of the remnant hemicellulose from the pulp, followed by a washing step in order to separate the cellulose product from an aqueous phase containing the hemicellulose and caustic.

The kraft process described above requires the use of a substantial amount of chemicals and produces a variety of toxic waste streams that must be managed and treated in order to mitigate environmental risks. The cost of waste management at a kraft-pulping mill can comprise a significant portion of the overall processing costs.

In addition to the kraft process described above, the "sulfite" process is used to produce high purity pulps with alpha cellulose contents in the range of 90 to 96 alpha or above, referred to as "dissolving" grade pulps. In the sulfite process, salts of sulfite or bisulfite are used to extract lignin and hemicellulose from wood. While the sulfite process is capable of producing a high purity alpha cellulose pulp, it is limited in the range of feedstocks it can accept, and requires the use of a large volume of toxic chemicals, of which only a relatively small portion can be recovered.

A further limitation of both the kraft and sulfite processes is their need to utilize feedstocks with relatively high cellulose contents, primarily woods, as high relative amounts of hemicellulose necessitates the increased consumption of pulping liquor. Further, hemicellulose is considered a by-product of the pulping process and is generally not recovered for any value-added applications.

As can be seen from the forgoing description of the prior art, there exists a need for a process to produce pulps that consumes a minimal amount of chemicals, produces little to no environmental contaminants, allows for simple isolation of the by-products (hemicellulose and lignin), and is capable of handling a range of lignocellulosic feedstocks, including agricultural and forest wastes.

SUMMARY OF THE INVENTION

In alternative embodiments, provided are methods and industrial processes for the production of pulp comprising: a) contacting a lignocellulosic feedstock with a fluid comprising water or steam and, optionally, carbon dioxide, and, optionally, nitrogen, and, optionally, compressed air to form a reaction mixture at a temperature in the range of between about 140° C. to about 250° C., and a pressure in the range of between about 200 psi to about 1500 psi, for a time period; thereby generating a reaction slurry comprising a concentrated solid cellulose product; and b) isolating the hemicellulose as the soluble stream; and c) recovering the cellulose product from the reaction slurry; and d) contacting the cellulose product with a caustic solution having a pH in the range of between about 12 and 14; thereby increasing the cellulose concentration in the solid product; and d) isolating the lignin as the alkaline soluble stream.

In alternative embodiments, provided are methods and industrial processes for the production of pulp, hemicellulose, and lignin comprising:
  (a) providing a lignocellulosic feedstock;
  (b) contacting a lignocellulosic feedstock with a fluid comprising water or steam and, optionally, carbon dioxide, and, optionally, nitrogen, and, optionally, compressed air to form a reaction mixture at a temperature in the range of between about 120° C. to about 250° C., and a pressure in the range of between about 200 psi to about 1500 psi, for a time period; thereby generating a reaction slurry comprising a concentrated solid cellulose product and solubilized hemicellulose product; and b) recovering the solid cellulose product from the reaction slurry; and c) recovering the aqueous stream containing the solubilized hemicellulose; and d) utilizing the aqueous stream containing the hemicellulose in a second reactor where fresh lignocellulosic feedstock is reacted at a temperature in the range of between about 140° C. to about 250° C., and a pressure in the range of between about 200 psi to about 1500 psi, for a time period; and e) recovering the solid concentrated cellulose product from the reaction slurry; and f) recovering the aqueous stream containing the hemicellulose; and g) contacting the cellulose product with a caustic solution having a pH in the range of between about 12 and 14; thereby increasing the cellulose concentration in the solid product; and h) isolating the lignin as the alkaline soluble stream; and i) contacting the aqueous stream containing the hemicellulose with an acid bring the pH in the range of between about 1 and 4 and performing a hydrolysis reaction to provide the hemicellulose monomers.

In alternative embodiments, the methods and industrial processes further comprise recovering the cellulose product from the reaction slurry.

In alternative embodiments, the methods and industrial processes further comprise recovering the hemicellulose product from the reaction slurry.

In alternative embodiments, the methods and industrial processes further comprise recovering the lignin product from the reaction slurry.

In alternative embodiments, the methods and industrial processes further comprise contacting the cellulose product with a caustic solution having a pH in the range of between about 10 and 14, for a time and temperature sufficient to increase the concentration of cellulose in the solid product, wherein optionally the contacting of the cellulose product with the caustic solution generates a solubilized lignin that is separated from the caustic material.

In alternative embodiments, the methods and industrial processes further comprise contacting the solubilized hemicellulose product with an acidic solution having a pH in the range of between about 1 and 4, for a time and temperature sufficient to hydrolyze the hemicellulose to the hemicellulose monomers, dimers and polysaccharides, wherein optionally the contacting of the hemicellulose product with the acidic solution generates an insoluble lignin that is separated from the acidic material.

In alternative embodiments, of the methods and industrial processes, the lignocellulosic material is reacted in a series of reactors wherein fresh lignocellulosic material is contacted with an aqueous stream containing hemicellulose, thereby increasing the hemicellulose concentration in the aqueous stream.

In alternative embodiments, of the methods and industrial processes, the lignocellulosic feedstock comprises: a wood, optionally a hardwood or a softwood; a cotton fiber; a grass; a straw; a cane; an agricultural residue, optionally a corn cob or a corn husk, or a sugar cane bagasse; a residue generated in an oil palm production process, optionally a palm mesocarp fiber; empty fruit bunch; a palm frond or a palm trunk; a rice husk; or, any combination thereof.

The details of one or more embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference for all purposes.

DETAILED DESCRIPTION OF THE INVENTION

In alternative embodiments, provided are methods industrial processes for the production of high purity, or "dissolving"-grade pulp or brown stock, suitable for use in the production of a variety end-products and/or chemical intermediates e.g., without limitation, paper, tissue, cardboard, packaging material, and the like. In alternative embodiments, provided are systems and methods for producing pulp, without consuming large quantities of toxic or harsh chemicals. In alternative embodiments, provided are methods and industrial processes for fractionating cellulose, hemicellulose, and lignin from non-conventional feedstocks, e.g. agricultural and forest residues.

As used herein, the term "feedstock" is used to describe the starting material in the fractionation process. The feedstock in the present invention can be any material comprising cellulose fibers, derived from any source, including any biomass. Exemplary fibers include, without limitation, lignocellulosic fibers such as those derived from wood, e.g. hardwoods or softwoods, as well as non-woody fibers comprising cellulose e.g. cotton fibers, various grasses, straws, canes and the like, agricultural residues such as corn cobs and husks, sugar cane bagasse, residues generated in the oil palm production process e.g. empty fruit bunch, palm mesocarp fibers, palm fronds, or palm trunks, rice husks, rice bran, or any combination thereof. The feedstock for the present invention can also be pre-processed, meaning that it has already undergone some amount of treatment to remove a portion of the non-cellulose portion of the feedstock (e.g. hemicellulose and/or lignin). An example of a pre-treated feedstock suitable for use in the present invention is a low alpha-cellulose kraft pulp, e.g. a kraft pulp with alpha cellulose content in the range of about 50% to about 88% alpha-cellulose.

The feedstock can be un-extracted, meaning it has not been purified to remove certain components, e.g. water, lipids, proteins, carbohydrates, or combinations thereof. In an exemplary embodiment, the feedstock is mesocarp fiber from palm fruits, said fruits having been pressed to extract the majority of the lipids contained therein. The mesocarp fibers can contain, for example, from about 0 wt % lipids to about 15 wt % lipids, e.g. 5% wt lipids, and about 50 wt % to about 99 wt % lignocellulosic material, e.g. 90 wt % lignocellulosic material, as well as other components in smaller amounts. The feedstock can comprise or exclude other components having been grown by a source other than the feedstock e.g. shells, husks, or other materials. The feedstock can be dried or partially dried to remove a portion of the water prior to reaction. The feedstock can be sized-reduced prior to reaction, meaning that it has been broken into smaller portions, thereby increasing the surface area available for reaction.

In alternative embodiments, the term "lignocellulose" or any derivative thereof e.g. "lignocellulosic", etc., refers to any plant fibers comprising carbohydrate polymers, e.g. cellulose and hemicellulose, bound together in a macro-structure with lignin.

In alternative embodiments, provided are systems and methods for the generation of pulp, hemicellulose, and lignin comprising a first hemicellulose-extraction step (referred to herein as the "extraction" step), followed by a cellulose-upgrading step. In alternative embodiments, the extraction step comprises contacting a lignocellulosic feedstock with a fluid that is below, near, or above the critical point of at least one component of the fluid. During the extraction step, the supercritical, near-critical, or sub-critical fluid exhibits enhanced solvolysis and penetration activity and serves to cleave the lignocellulosic material to generate a solid cellulose product of relatively low-purity and a solubilized hemicellulose product.

In alternative embodiments, this low-purity cellulose product is then subjected to an upgrading step wherein it is further reacted to remove all or a portion of the remaining non-cellulose components, thereby generating a pulp product of higher-purity suitable for sale as brown stock or purified further by bleaching. The upgrading step can comprise, for example, a "cold-caustic" extraction, wherein the all or a portion of the hemicellulose and lignin in the extracted product is solubilized by contacting it with a solution comprising a strong caustic e.g. sodium hydroxide.

In alternative embodiments, methods and systems as provided herein can further comprise a caustic-recovery step wherein the solubilized hemicellulose and lignin from the upgrading step is separated from the caustic material by means known in the art e.g. nanofiltration or electrolysis, and the caustic is recycled for use in the extraction process.

Biomass Fractionation and Cellulose Extraction

In alternative embodiments, a biomass feedstock is fractionated to cellulose, lignin, and hemicellulose, and cellulose is recovered from a product slurry in a first reaction stage. In alternative embodiments, the feedstock is contacted with a fluid in a supercritical, near-critical state, or subcritical state. In certain embodiments, the fluid and the feedstock are combined prior to entering the reactor to form a slurry which is fed to the reactor as a reaction mixture.

In other embodiments, the feedstock and fluid are fed to the reactor in separate streams and form a reaction mixture.

In alternative embodiments, in order to achieve the desired solvolysis activity of the fluid in the reaction mixture, the mixture is heated and pressurized to a point that is at, near or above the supercritical points of one or more of the components in the fluid. When the desired reaction conditions are achieved, the lignocellulosic feedstock is cleaved into its primary components, e.g. cellulose, hemicellulose, and lignin and a product slurry is formed comprising said components. During the reaction, all or a portion of the hemicellulose present in the feedstock is cleaved from the lignocellulosic structure, some or all of which be further hydrolyzed into pentose and/or hexose sugars in the same reaction step. The resulting product slurry comprises a soluble fraction, comprising the hemicellulose and/or hemicellulose derivatives and lignin, and an insoluble fraction, comprising solid cellulose and lignin. The product slurry is then sent to a liquid/solid separation system wherein the insoluble portion comprising the cellulose is removed from the product slurry, washed with water, and then sent to the cellulose upgrading system. The hemicellulose and/or derivatives thereof can be recovered from the product slurry through means known in the art for use in various industrial processes, some or all of the soluble fraction may be utilized as the extraction medium with fresh feedstock. Recycling the soluble fraction allows for lower water and gas (e.g. carbon dioxide, nitrogen, or air) consumption, lowers heating costs, and allows for a more concentrated hemicellulose stream.

In alternative embodiments, the fluid comprises a mixture of water and subcritical or supercritical carbon dioxide. Temperatures and pressures for subcritical and supercritical carbon dioxide are known in the art. Supercritical carbon dioxide can have a temperature, for example, of more than about 31.10° C., and a pressure at or above 1071 psi. In alternative embodiments, the fluid further comprises carbonic acid. In alternative embodiments, the fluid comprises water, carbon dioxide, nitrogen, and air. In alternative embodiments, the fluid comprises hemicellulose, hemicellulose derivatives, acetic acid, and other soluble components extracted from the feed stock.

The carbon dioxide can be, for example, in the range of between about 1 wt % to about 95 wt % of the fluid, for example, 10 wt % to about 30 wt %. The amount of water can be, for example, in the range of between about 5 wt % to about 95 wt % of the fluid, for example, about 70 wt % to about 90 wt %.

The temperature of the reaction can be, for example, in the range of between about 120° C. to about 250° C. or about 100° C. to about 300° C. In alternative embodiments, the pressure of the reactor for the reaction can be in the range of between about 200 psi to about 2000 psi, for example, between about 400 psi and about 800 psi, or about 800 psi to about 1200 psi. In alternative embodiments, the pressure of the reactor is applied by the vapor pressure the contents and/or through the use of compressed gases (e.g. carbon dioxide, nitrogen, air).

In alternative embodiments, the reaction is carried out for a period in the range of about 1 minute to about 480 minutes, for example, in the range of between about 10 minutes to about 200 minutes, about 60 minutes to about 180 minutes, or about 120 minutes to about 180 minutes. The reaction time will depend on the selected reaction system and operating conditions and is generally sufficient to allow for the conversion of the reaction mixture to the desirable product mixture without allowing for excess production of undesirable reaction products. At higher temperatures and pressures, the reaction time can be reduced.

In alternative embodiments, in the foregoing reaction conditions, the fluid acts as a solvent and reactant on the lignocellulosic feedstock and, via hydrolysis, hemicellulose and lignin polymers are extracted from the lignocellulose structure macro-structure of the feedstock. In alternative embodiments, during the reaction, conditions are maintained such that the majority of the cellulose polymers are unreacted, meaning that they are not further cleaved into glucose monomers or other short-chain polysaccharides. In alternative embodiments, this is desirable to allow for the cellulose component to be used as a pulp product. Some or all the hemicellulose may be further cleaved into xylose monomers, dimers, and other polysaccharides during the reaction step.

After the insoluble fraction comprising the cellulose is separated from the product slurry, a portion of the lignin, hemicellulose, and any hemicellulose derivatives, if present, remain in the aqueous water phase of the product slurry. The lignin can be separated from the hemicellulose and/or hemicellulose derivatives by one of several methods known in the art, e.g. filtration, centrifugation, or the like. The solubilized lignin and hemicellulose and/or hemicellulose derivatives can be recovered and used in various downstream applications.

The reactor system can be batch, continuous, or semi-continuous. There are several conventional pressure vessel systems available that will operate in batch, continuous, and semi-continuous modes and would be suitable for the reactor system used in this stage. In addition, a continuous pipe-type (i.e. plug-flow) reactor can be used to carry out the reaction. A plug flow reactor is a pipe that is maintained at the target pressure and temperature ranges and allows the reaction mixture to pass through the internal volume of the pipe. In such a system, the reaction mixture is sent through the reactor at a constant speed, thereby exposing the reaction mixture to a constant temperature and pressure for a predetermined time. The plug flow reactor system also allows for a continuous process, as material can be fed into the reactor at the same rate at which reaction products exit the vessel.

In alternative embodiments, the reactor system is a series of reactors wherein a portion of the reaction medium containing the extracted material (water soluble material), fresh water, steam, and compressed gases are feed into the next reactor in series.

In alternative embodiments, following extraction, the insoluble portion of the product slurry, comprising primarily cellulose fibers, is separated from the soluble portion comprising the hemicellulose and/or hemicellulose monomers. In alternative embodiments, the separated cellulose is washed and screened to remove residual impurities. In alternative embodiments, the separated cellulose product further comprises some amount of hemicellulose that is still bound to the cellulose fibers. The relative amount of cellulose to other products in the separated cellulose portion, as measured by the alpha-cellulose content of the cellulose product, can be, for example, in the range of about 40 to 90 alpha (i.e. 40% to about 90% alpha cellulose), e.g. between about 40 to 88 alpha.

Cellulose Upgrading

In alternative embodiments, following the biomass fractionation and extraction stage, the cellulose fibers obtained in the fractionation and extraction step are sent to cellulose upgrading process wherein all or a portion of the non-cellulose impurities therein are removed, providing a cellulose product in higher purity. In alternative embodiments, a cellulose product is obtained by subjecting the cellulose fibers to an alkaline treatment as the process described in U.S. Pat. No. 6,896,810 or 7,854,847, both of which are incorporated by reference herein.

In alternative embodiments, the un-treated cellulose fibers are subjected to an upgrading process comprising containing the fibers with a solution comprising ammonium carbonate. In a first step, the fibers are washed in the ammonium carbonate solution, wherein the relatively high pH of the solution causes all or a portion of the hemicellulose to be fractionated from the cellulose fibers, providing a cellulose product with a higher alpha number than starting material. The wash liquor comprising the hemicellulose can then be heated to convert the ammonium carbonate into ammonium bicarbonate and gaseous ammonia, both of which can be recovered and recompressed to reform the ammonium carbonate. The reformed ammonium carbonate can then be recycled for subsequent reactions with the untreated cellulose fibers. The hemicellulose will be solubilized in the wash liquor and can be separated therefrom using any suitable method known in the art, e.g. filtration, centrifugation, or the like.

By subjecting the fibers to a caustic treatment process, a portion, or all, of the hemicellulose and other non-cellulose components in the un-treated cellulose material are removed, yielding a cellulose product that is suitable for use as a brown stock pulp. Because the reaction step used to fractionate the biomass and extract the cellulose does not significantly disrupt the structure of the cellulose polymers, the resulting product will have a relatively uniform molecular weight, which is a desirable characteristic in pulps.

Hemicellulose Hydrolysis

In alternative embodiments, following the biomass fractionation and extraction stage, the solubilized hemicellulose obtained in the fractionation and extraction step are sent to hemicellulose hydrolysis process wherein all or a portion of the hemicellulose is hydrolyzed to provide the hemicellulose monomers and other higher order oligomers. In alternative embodiments, the hemicellulose monomers are obtained by subjecting the hemicellulose containing fraction to acid-catalyzed or thermally drive hydrolysis.

In alternative embodiments, the hemicellulose monomers and oligomers are concentrated by the removal of water and other volatile impurities by evaporation. In alternative embodiments, volatile impurities are removed with the stream stripping.

A number of embodiments of the invention have been described. Nevertheless, it will be understood that various modifications may be made without departing from the spirit and scope of the invention. Accordingly, other embodiments are within the scope of the following claims.

What is claimed is:

1. A method or industrial process for the fractionation of a biomass or a lignocellulosic feedstock, and producing a cellulose pulp product, comprising:
   a. contacting the biomass or lignocellulosic feedstock with a fluid comprising water and carbon dioxide to form a reaction mixture at a temperature of between 120° C. and 250° C., a pressure of between 150 psi and 1500 psi for a time period;
   thereby generating a reaction slurry comprising at least a solid cellulose pulp product and a solubilized hemicellulose product;
   b. recovering the solid cellulose pulp product from the reaction slurry;
   c. washing and screening the solid cellulose pulp product to separate and remove residual impurities; and
   d. contacting the solid cellulose pulp product with a caustic or basic solution having a pH in the range of between 10 and 14 for a sufficient amount of time to increase the concentration of cellulose in the solid cellulose product, thereby producing a solubilized hemicellulose and lignin and solubilizing all or a portion of residual hemicellulose and lignin;
   thereby increasing the purity of the solid cellulose pulp product by removing a portion of the lignin and the residual hemicellulose.

2. The method of claim 1, comprising:
   contacting the solubilized hemicellulose product with an acidic solution having a pH in the range of between pH 1 and 4 to generate a hydrolyzed hemicellulose;
   thereby hydrolyzing a large portion of the hemicellulose to hemicellulose monomers.

3. The method of claim 2, further comprising concentrating the hydrolyzed hemicellulose through the removal of water and volatile impurities.

4. The method of claim 1, further comprising recovering the solid cellulose pulp product from the reaction slurry.

5. The method of claim 1, further comprising washing the solid cellulose pulp product with water for removing residual impurities.

6. The method of claim 1, wherein the contacting of the solid cellulose pulp product comprises contacting with a caustic solution having a pH in the range of between 10 and 14 at a temperature sufficient to remove a portion of lignin and residual hemicellulose from the solid cellulose pulp product.

7. The method of claim 6, wherein the contacting of the solid cellulose pulp product comprises contacting with a caustic solution having a pH in the range of between 10 and 14 at a temperature of 120° C.

8. The method of claim 1, wherein the solubilized hemicellulose and lignin are separated by a process comprising use of nanofiltration or electrolysis after contacting the solid cellulose pulp product with a caustic solution.

9. The method of claim 1, further comprising utilizing the solubilized hemicellulose product in part as a reaction medium for the extraction of hemicellulose from fresh lignocellulosic feedstock.

10. The method of claim 1, where in the lignocellulosic feedstock or the biomass comprises any of: a wood; a cotton fiber; a grass; a straw; a cane; an agricultural residue; a residue generated in an oil palm production process; an empty fruit bunch; a palm frond or a palm trunk; a rice husk; a rice bran; or, any combination thereof.

11. The method of claim 10, wherein the wood comprises a hardwood or a softwood.

12. The method of claim 10, wherein the agricultural residue comprises a corn cob or a corn husk, or a sugar cane bagasse.

13. The method of claim 10, wherein the residue generated in the oil palm production process comprises a palm mesocarp fiber.

14. The method of claim 1, wherein the method comprises contacting the lignocellulosic feedstock with a fluid comprising water and carbon dioxide to form a reaction mixture at a temperature of between 140° C. and 160° C.

15. The method of claim 1, wherein the method contacting a lignocellulosic feedstock with a fluid comprising water and carbon dioxide in the form of a compressed gas.

16. The method of claim 1, wherein the method contacting a lignocellulosic feedstock with a fluid comprising water and carbon dioxide in the form of a supercritical fluid.

17. The method of claim 1, wherein the contacting in step (d) lasts for between 1 min and 1 hour.

18. The method of claim 1, wherein the contacting in step (d) is at a pressure of between 200 and 250 psi.

19. The method of claim 1, wherein the contacting of the solid cellulose pulp product with a caustic or basic solution having a pH in the range of between 10 and 14 comprises use of a cold-caustic solution.

* * * * *